United States Patent
Lee et al.

(10) Patent No.: US 8,634,818 B2
(45) Date of Patent: Jan. 21, 2014

(54) MOBILE TERMINAL AND CONTROL METHOD

(75) Inventors: Tae Young Lee, Seoul (KR); Tae Yong Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 12 days.

(21) Appl. No.: 13/191,363

(22) Filed: Jul. 26, 2011

(65) Prior Publication Data
US 2012/0052847 A1  Mar. 1, 2012

(30) Foreign Application Priority Data
Aug. 24, 2010  (KR) .................. 10-2010-0081908

(51) Int. Cl.
*H04M 3/00* (2006.01)
(52) U.S. Cl.
USPC ...... 455/418; 455/420; 455/414.1; 455/550.1
(58) Field of Classification Search
USPC ........... 455/418, 550.1, 414.1, 420; 358/1.15; 725/62
See application file for complete search history.

(56) References Cited

U.S. PATENT DOCUMENTS

| | | | | |
|---|---|---|---|---|
| 7,212,783 B2 * | 5/2007 | Gaumond et al. | ........... | 455/3.06 |
| 2002/0151327 A1 * | 10/2002 | Levitt | ............................. | 455/556 |
| 2005/0231761 A1 * | 10/2005 | Pineau | ........................ | 358/1.15 |
| 2008/0220767 A1 | 9/2008 | Aretz et al. | | |
| 2009/0061841 A1 * | 3/2009 | Chaudhri et al. | ............. | 455/420 |
| 2010/0131989 A1 * | 5/2010 | Casimere | ........................ | 725/62 |

FOREIGN PATENT DOCUMENTS

| EP | 2164258 | 3/2010 |
|---|---|---|
| JP | 2006-211539 | 8/2006 |

OTHER PUBLICATIONS

European Search Report dated Dec. 27, 2011 issued to related European Patent Application No. 11176526.9.

* cited by examiner

*Primary Examiner* — Danh Le
(74) *Attorney, Agent, or Firm* — H.C. Park & Associates, PLC

(57) ABSTRACT

A mobile terminal and control method to share content with a device and control the device are provide. The mobile terminal includes a communication unit to communicate with a host and the device; a search unit to receive content information and device information; an input unit to receive a content selection signal and a device selection signal; and a control unit to control the mobile terminal. The mobile terminal receives content information from a host and selects content to be outputted to a device selected from device information from the host. The mobile terminal controls the selected device using control commands transmitted to the selected device based on a control mode. If the control mode is not stored in the mobile terminal, the mobile terminal may receive the control mode from the host.

21 Claims, 8 Drawing Sheets

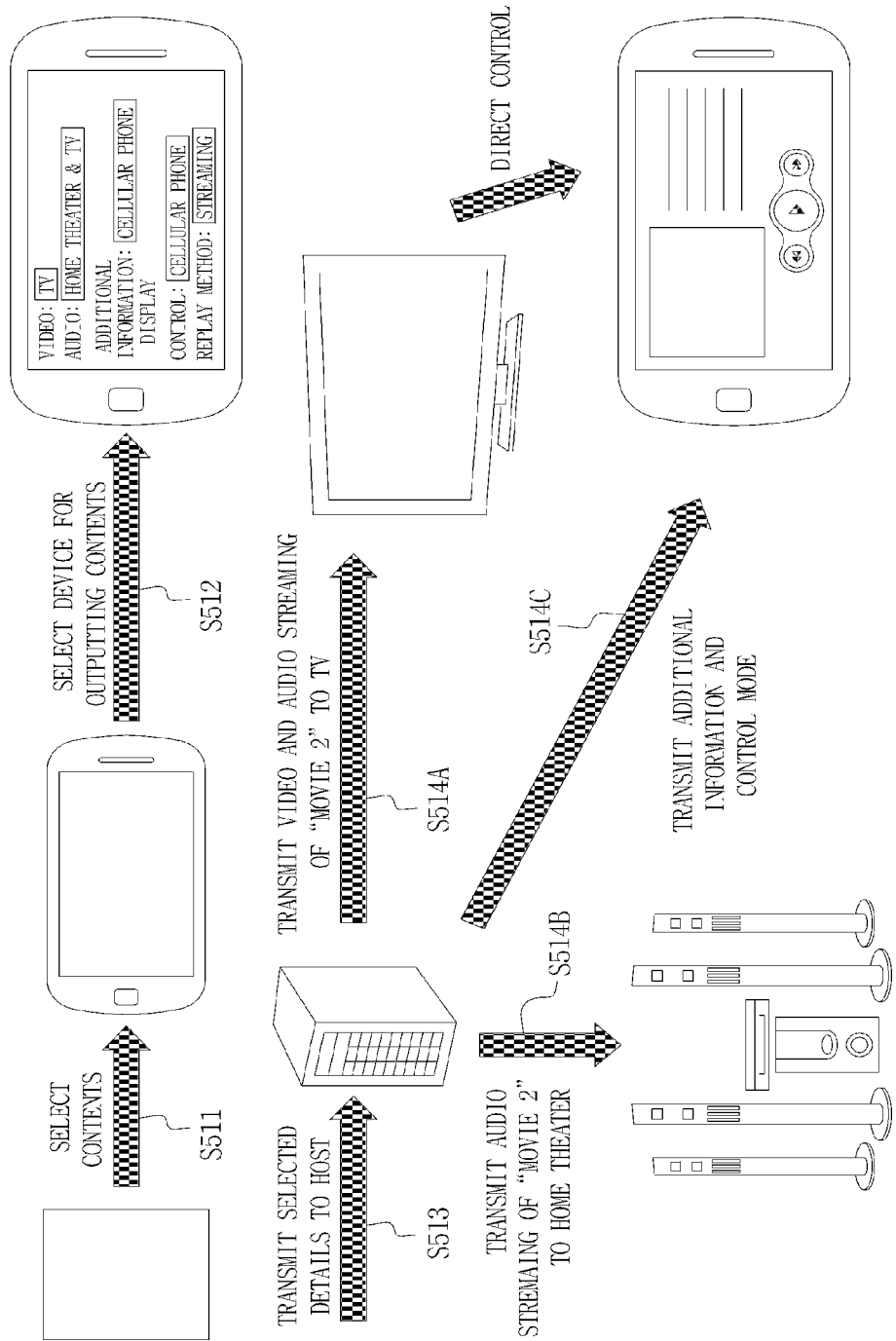

MOBILE TERMINAL AND CONTROL METHOD

CROSS-REFERENCE TO RELATED APPLICATION

This application claims priority from and the benefit under 35 U.S.C. §119(a) of Korean Patent Application No. 10-2010-0081908, filed on Aug. 24, 2010, which is hereby incorporated by reference for all purposes as if fully set forth herein.

BACKGROUND

1. Field

The following description relates to an apparatus including a mobile terminal and a control method using the same that may share content with a device and may control the device using a cloud computing system.

2. Discussion of the Background

As mobile communication technologies and infrastructure have rapidly developed, mobile terminals have been developed as media that provide various services, such as general audio communication, games, message transmission, message reception, internet search, wireless information communication, electronic schedulers, digital cameras and video communication, etc.

Accordingly, with new technologies and functions that stimulate customers' interest, various applications suitable for users' requirements are built in mobile terminals. Thus, users can make use of audio information, character information, video information, MP3, games, etc., using mobile terminals.

SUMMARY

Exemplary embodiments of the present invention provide a mobile terminal and a control method using the same that share content with a device and may controls the device using a cloud computing system.

Additional features of the invention will be set forth in the description which follows, and in part will be apparent from the description, or may be learned by practice of the invention.

An exemplary embodiment of the present invention discloses a mobile terminal including: a communication unit to communicate with a host and a device; a search unit to receive content information and device information from the host; an input unit to receive a content selection signal and a device selection signal; and a control unit to transmit to the host, a control command to control a selected content corresponding to the content selection signal to be outputted to a selected device corresponding to the device selection signal.

An exemplary embodiment of the present invention also discloses a control method of a mobile terminal, including: receiving content information and device information; receiving a content selection signal and a device selection signal; generating a control command for controlling a content corresponding to the content selection signal; and transmitting the control command to a host.

An exemplary embodiment of the present invention also discloses a system for sharing content, including: a mobile terminal; a host; and a plurality devices, wherein the mobile terminal receives content information and device information from the host, selects content from the content information and selects at least one device from the plurality of devices, transmits information containing the selection of the content and the selected device to the host; wherein the host transmits the content to the selected device and the mobile terminal controls the selected device based on a control mode.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 5A is an illustration of the process of sharing content using a mobile terminal according to an exemplary embodiment.

DETAILED DESCRIPTION OF THE ILLUSTRATED EMBODIMENTS

Figure 1:
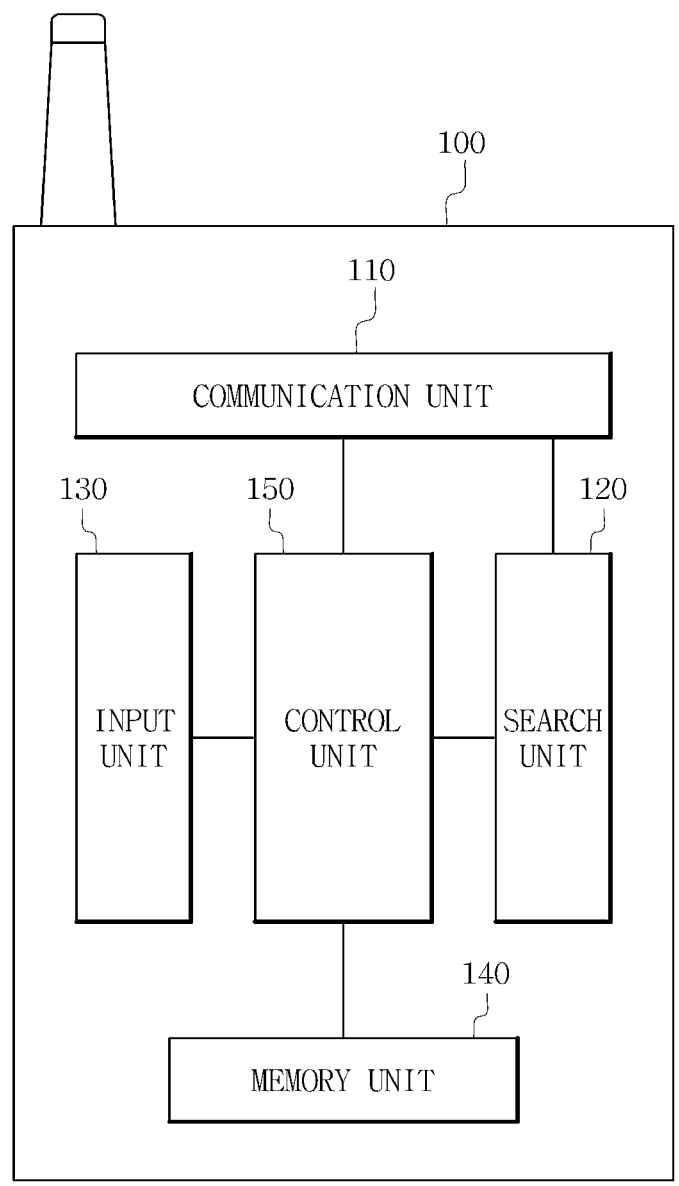
FIG. 1 is a view of a mobile terminal according to an exemplary embodiment.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the drawings, like reference numerals denote like elements. The shape, size and regions, and the like, of the drawing may be exaggerated for clarity.

The terminology used herein is for the purpose of describing particular embodiments only and is not intended to be limiting of this disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a view of a mobile terminal according to an exemplary embodiment.

Referring to FIG. 1, the mobile terminal 100 includes a communication unit 110, a search unit 120, an input unit 130, a memory unit 140 and a control unit 150.

The communication unit 110 communicates with a host and a device via a wired or wireless connection. The device may be any device that can output content. For example, the device may be a TV, an audio player, a camera, a printer, a game machine, etc. The host may be a control system that communicates with each device in a cloud computing system, and may include a server, etc. The mobile terminal 100 may receive content information and device information from the host through the communication unit 110, and transmit a control command, to control the device, to the host through the communication unit 110. The mobile terminal 100 may receive additional information, such as a control mode, etc., from the host through the communication unit 110. In addition, the mobile terminal 100 may receive additional information from the device through the communication unit 110. Devices for communicating with the mobile terminal 100 may be distinguished from each other by using different IDs and may be registered in the host, so that the mobile terminal 100 can communicate with each of the devices through the host or can directly communicate with each of the devices using Wi-Fi®, Bluetooth®, infrared data association (IrDA)® or the like.

The search unit 120 receives content information and device information, from the host through the communication unit 110. The content information includes information about content available for sharing. The device information includes information about a device capable of sharing content. If there is more than one device capable of sharing content, the search unit 120 may receive the device information in a list form. In an exemplary embodiment, the search unit 120 receives content information from the host. By way of example, if a selection signal for arbitrary content is received, the search unit 120 may then receive device information from a host.

The input unit 130 receives commands to control the operation of the mobile terminal. In an exemplary embodiment, a user may generate commands to control the operation of the mobile terminal. The input unit 130 may receive a content selection signal and a device selection signal. In an exemplary embodiment, the content selection signal and the device selection signal may be received from the user. The input unit 130 may simultaneously or sequentially receive the content selection signal and the device selection signal based on the search method of the search unit 120. If the content to be outputted is content capable of being outputted from multiple devices, the input unit 130 may receive device selection signals for multiple devices. For example, if the selected content is related to a movie, the input unit 130 may receive a device selection signal for one or more of: a video output device, an audio output device, an additional information output device, and a control device. By way of example, if the selected content is related to a game capable of being simultaneously played by multiple users, the input unit 130 may receive a device selection signal for one or more of: a video output device, an audio output device, and multiple control devices.

The memory unit 140 may have content information stored therein. The memory unit 140 may include previously stored content. By using the content information stored in the memory unit 140, the mobile terminal 100 may control the selected content to be outputted to the selected device. The memory unit 140 may store one or more pieces of content information in list form. The memory unit 140 may further store device information.

The control unit 150 generally controls the operation of the mobile terminal as well as a process for data communication. If a content selection signal and a device selection signal are received through the input unit 130, the control unit 150 transmits, to the host, a control command for controlling the content to be outputted to the device. The content may be content capable of being controlled through the mobile terminal 100, such as a moving picture, a game, a program, etc. The content may be stored in the memory unit 140 or the host. The control unit 150 may control arbitrary content to be outputted to an arbitrary device using the content information stored in the memory unit 140. If a content selection signal and a device selection signal are received through the input unit 130, the control unit 150 may display a control image capable of controlling the selected device on a display screen of the mobile terminal 100. While the selected content is outputted to the selected device, the control unit 150 may transmit a control command capable of controlling the selected device to the host or the selected device.

The control unit 150 may receive additional information about the content, outputted through the selected device, from the host or the selected device. The control unit 150 may control the received additional information and display the additional information on the display screen of the mobile terminal 100. The control unit 150 may display a control image capable of controlling the selected device on the display screen of the mobile terminal 100 and control the selected device through the displayed control image. If a control mode capable of controlling the selected device does not exist in the mobile terminal 100, the control unit 150 may receive a control mode capable of controlling the device from the host or the device, and may transmit a control command using the received control mode.

The control mode may be set based on the kind of device or the kind of content selected. By way of example, in the case of video or audio content, the control mode may be a control image including features, such as play, stop, fast forward, rewind, etc. By way of further example, in the case of game content, the control mode may be an image capable of controlling motion in the up, down, left and right directions. The control mode may further include additional information, such as information about the content, evaluation details, directions or outlines, in addition to the image for controlling the content outputted through the device. If the selected device reproduces the selected content, the control unit 150 may control the selected content to be outputted by a reproduction method, for example, by downloading, streaming, etc.

In an exemplary embodiment, while sharing the selected content with the selected device through the host, the control unit 150 may change the device on which the selected content is outputted. For example, if the selected content is related to a movie, the video output device, the audio output device and the control device may be set to be a TV, a home theater and a mobile terminal, respectively. Thereafter, the video output device, the audio output device and the control device may be changed to be the mobile terminal based on a user's command, allowing the content to be continuously used if the user changes his environment. In an exemplary embodiment, in order to prevent illegal reproduction or sharing of content, the control unit 150 may transmit a control command for recovering the selected content to the host or the selected device if the output of the selected content is finished.

Figure 2:
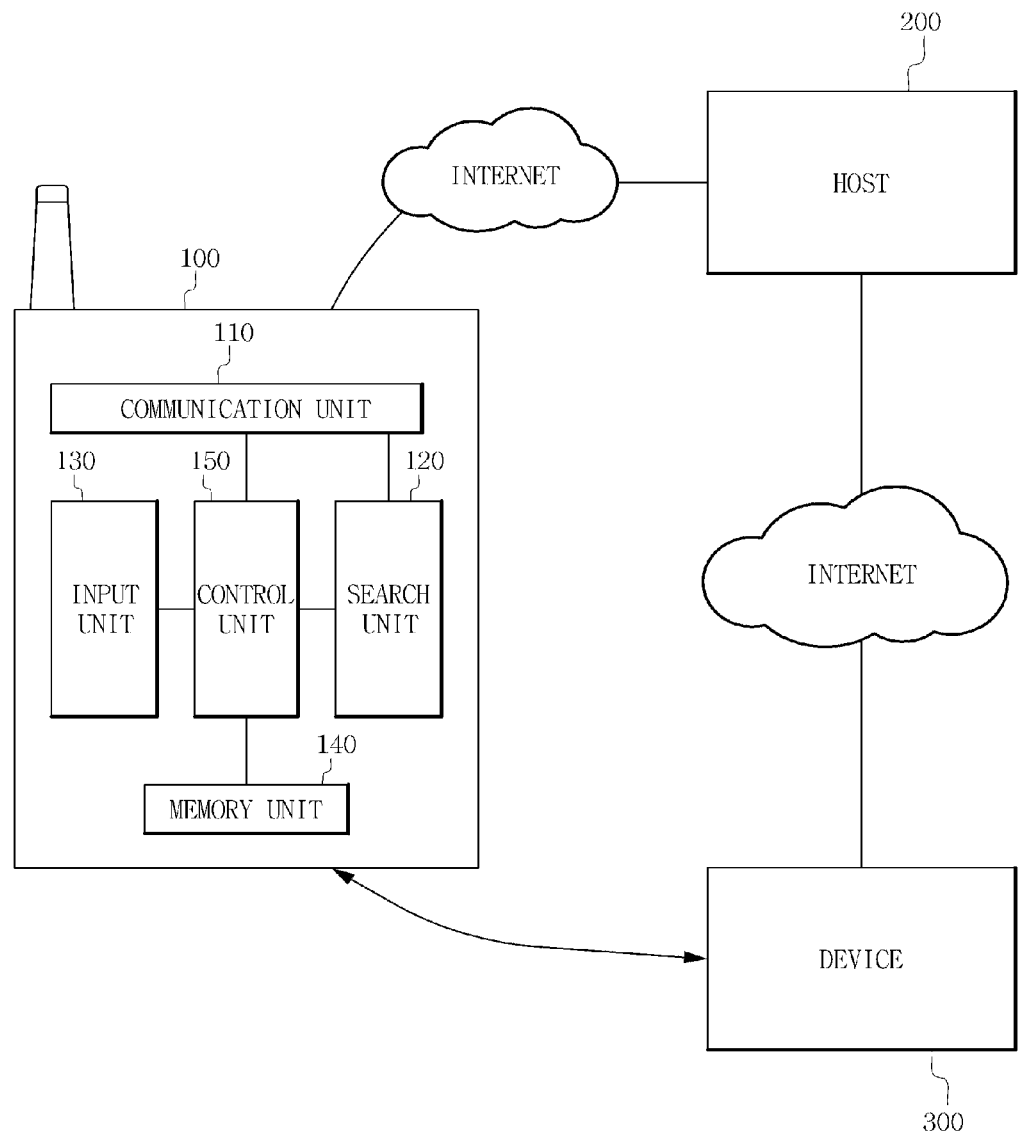
FIG. 2 is a view illustrating a relationship among a mobile terminal, a host and a device according to an exemplary embodiment.

FIG. 2 is a view illustrating a relationship among a mobile terminal, a host and a device according to an exemplary embodiment.

Referring to FIG. 2, the relationship includes a mobile terminal 100, a host 200 and a device 300. The connection between the mobile terminal 100 and the host 200 may be performed through a wired and/or wireless connection. The device 300 may be registered in the host 200 using different IDs, such as a MAC address, a serial number, or a device model ID. The communication between the host 200 and the device 300 may be performed through a wired and/or wireless connection. The connection between the mobile terminal 100, the host 200 and the device 300 may be through an internet and/or an intranet network. Direct communications between the host 200 and the device 300 may be performed through Wi-Fi®, Bluetooth®, IrDA®, etc.

Figure 3:
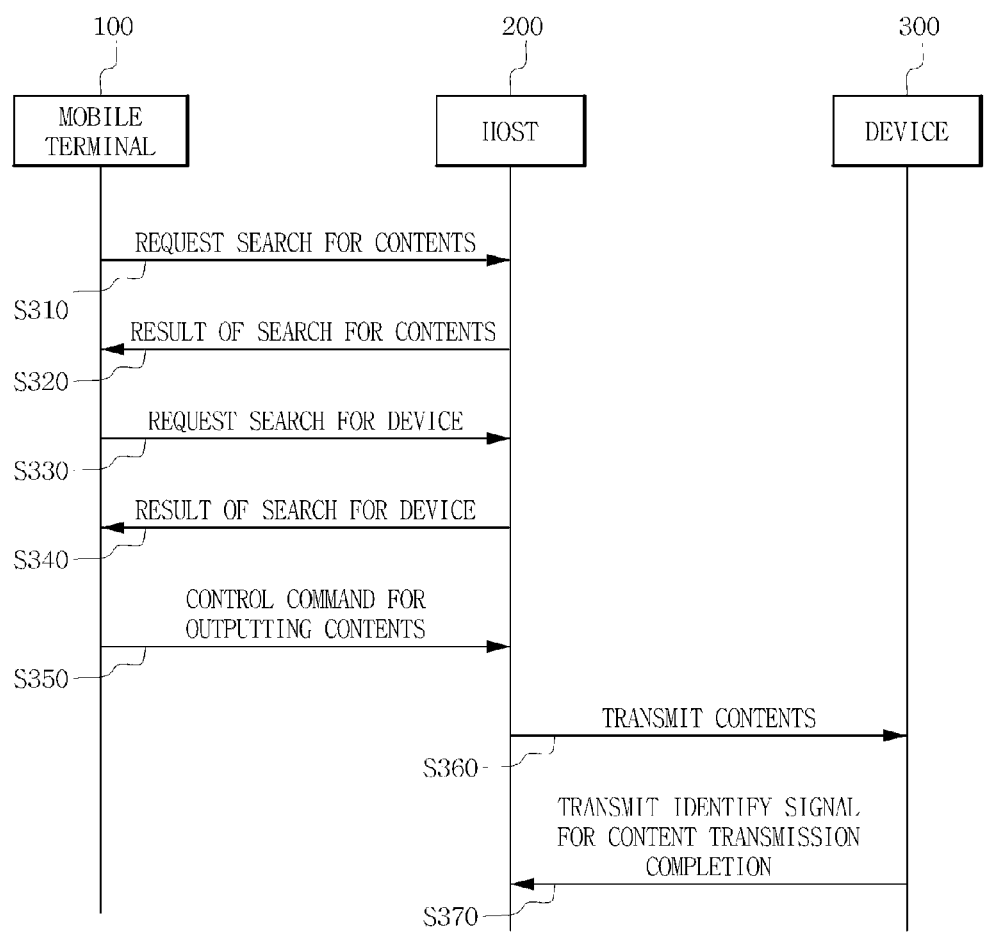
FIG. 3 is a flowchart of a communication process among a mobile terminal, a host and a device according to an exemplary embodiment.

FIG. 3 is a flowchart of a communication process among a mobile terminal, a host and a device according to an exemplary embodiment.

Referring to FIG. 3, in operation S310, the mobile terminal 100 requests a search for content from the host 200. In an exemplary embodiment, the content may be stored in the mobile terminal 100, the host 200 or the device 300. In operation S320, the host 200 provides results of a search for content to the mobile terminal 100. If content information is stored in the mobile terminal 100, the mobile terminal 100 may use the content information stored therein. In an exemplary embodiment, the mobile terminal 100 may select arbitrary content. In operation S330, the mobile terminal 100 requests a search for a device capable of outputting the selected content, i.e., device information. In operation S340, the host 200 transmits to the mobile terminal 100 results of a search for device information, i.e., devices capable of outputting the selected content. If device information is stored in the mobile terminal 100, the mobile terminal 100 may use the device information stored therein. The mobile terminal 100 may select an arbitrary device using the device information. In operation S350, the mobile terminal 100 transmits to the host 200 a control command for outputting content. In operation S360, the host 200 transmits the content to the selected device 300, so that the selected content are outputted through the selected device 300. If the transmission of the content is completed, the selected device 300 transmits an identification signal for the content transmission completion to the host 200 in operation S370.

Figure 4A:
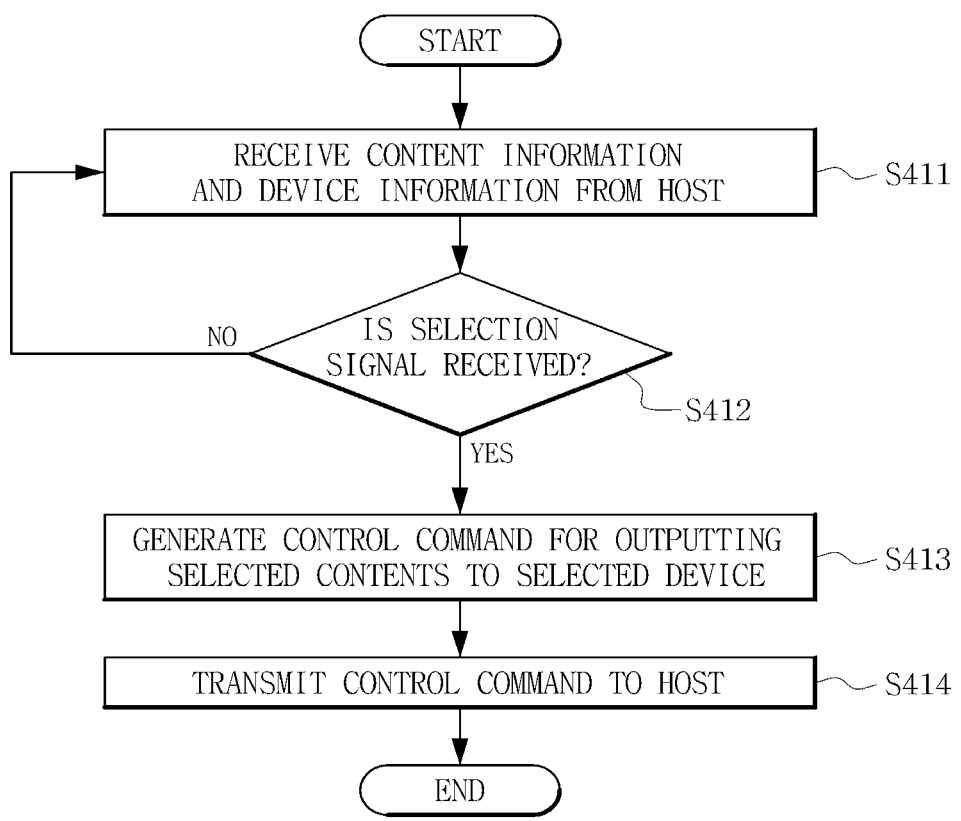
FIG. 4A is a flowchart of a control method of a device using a mobile terminal according to an exemplary embodiment.

FIG. 4A is a flowchart of a control method of a device using a mobile terminal according to an exemplary embodiment. Although depicted as being performed serially, at least a portion of the operations of the method of FIG. 4A may be performed contemporaneously, or in a different order than presented in FIG. 4A.

In operation S411, a mobile terminal receives content information and device information from a host. If the content information is stored in the mobile terminal, the mobile terminal may use the content information stored therein. In operation S412, the mobile terminal determines if a content selection signal and a device selection signal are received. In operation S413, the mobile terminal generates a control command for outputting selected content to the selected device. The mobile terminal transmits the control command to the host in operation S414.

Figure 4B:
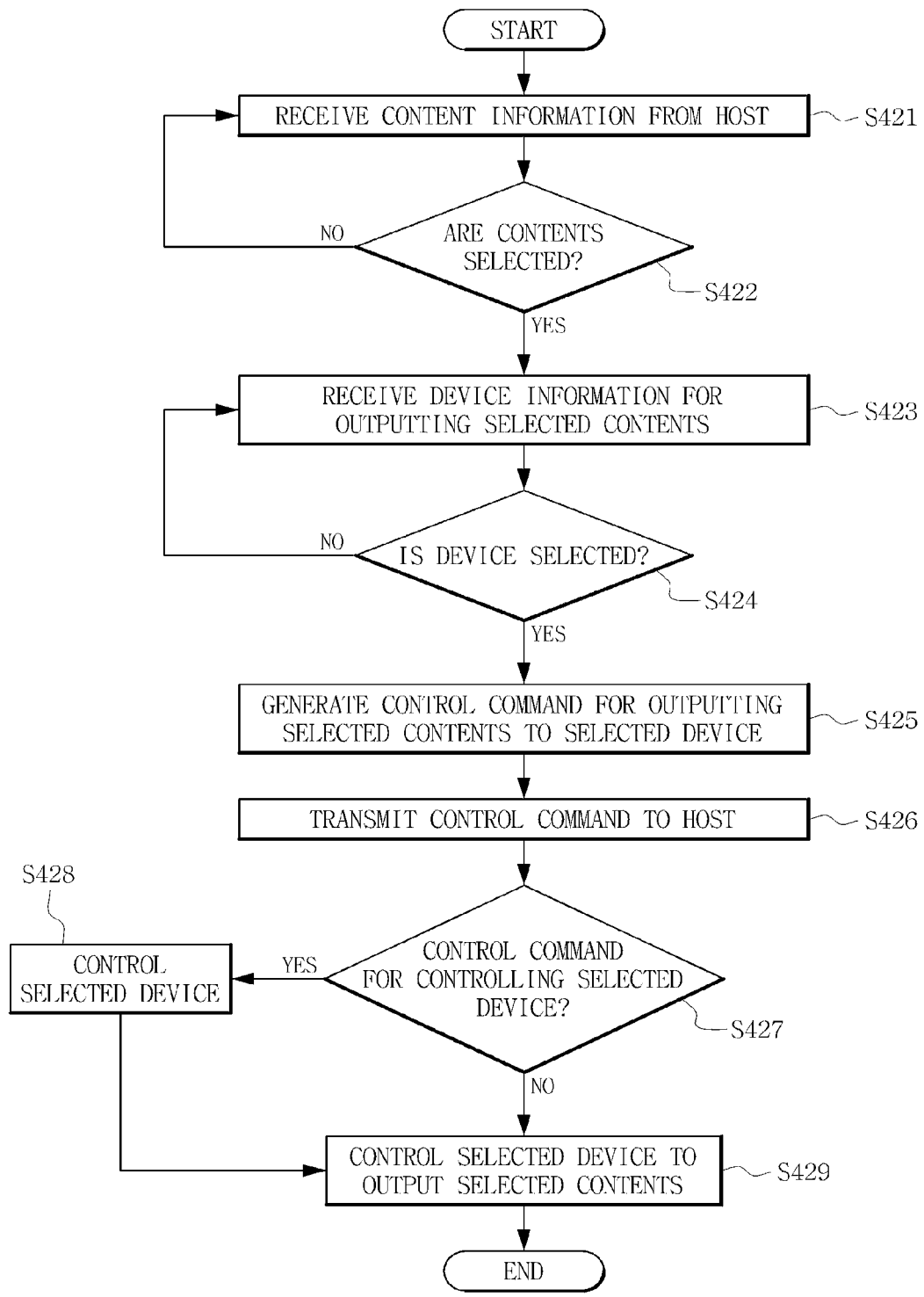
FIG. 4B is a flowchart of a control method of a device using a mobile terminal according to an exemplary embodiment.

FIG. 4B is a flowchart of a control method of a device using a mobile terminal according to an exemplary embodiment. Although depicted as being performed serially, at least a portion of the operations of the method of FIG. 4B may be performed contemporaneously, or in a different order than presented in FIG. 4B.

A mobile terminal receives content information from a host in operation S421. If the content information is stored in the mobile terminal, the mobile terminal may use the content information stored therein. In operation S422, the mobile terminal determines if content is selected based on the receipt of a content selection signal. The mobile terminal requests the host to transmit device information for outputting selected content. In operation S423 the mobile terminal receives the device information for outputting selected content. In operation S424, the mobile terminal determines if a device is selected according to receipt of a device selection signal by the mobile terminal. The mobile terminal generates a control command for outputting selected content to a selected device, in operation S425. In operation S426 the mobile terminal transmits a control command to the host. This results in the selected device outputting the selected content in operation S429. In an exemplary embodiment, if a control command to control the selected device is received by the mobile terminal in operation S427, the mobile terminal controls the selected device based on the received control command in operation S428. If the control mode for controlling the selected device does not exist in the mobile terminal, the mobile terminal may receive a control mode from the host or the selected device. The mobile terminal may control the selected device using the received control mode. Through the processes of FIG. 4A and FIG. 4B, while the selected content are outputted to the selected device, the mobile terminal may further receive additional information about the content outputted from the host or the selected device.

FIG. 5A is an illustration of the process of sharing content between a mobile terminal and a device according to an exemplary embodiment.

FIG. 5A is an illustration of a process of sharing content using a mobile terminal according to an exemplary embodiment.

In operation S511, the mobile terminal connects to a host and a user selects "Movie 2" as an arbitrary content. The host transmits to the mobile terminal a device list of devices capable of reproducing the selected movie content. In operation S512, the user selects devices for outputting content. The user may also select an output method using the device list. In the exemplary embodiment, the user selects a "TV" as a video device, a "home theater and the TV" as an audio output device, a "cellular phone" as an additional information display device, "cellular phone" as a control device, and "streaming" method as the reproduction method. The mobile terminal transmits the selected details to the host, in operation S513. In operation S514A, the host transmits video and audio of the Movie 2 to the TV using the streaming method. The host transmits audio of the Movie 2 to the home theater using the streaming method, in the operation S514B. The host transmits additional information and a control mode to the cellular phone in operation S514C. Thus, the cellular phone may directly control the output of the Movie 2.

Figure 5B:
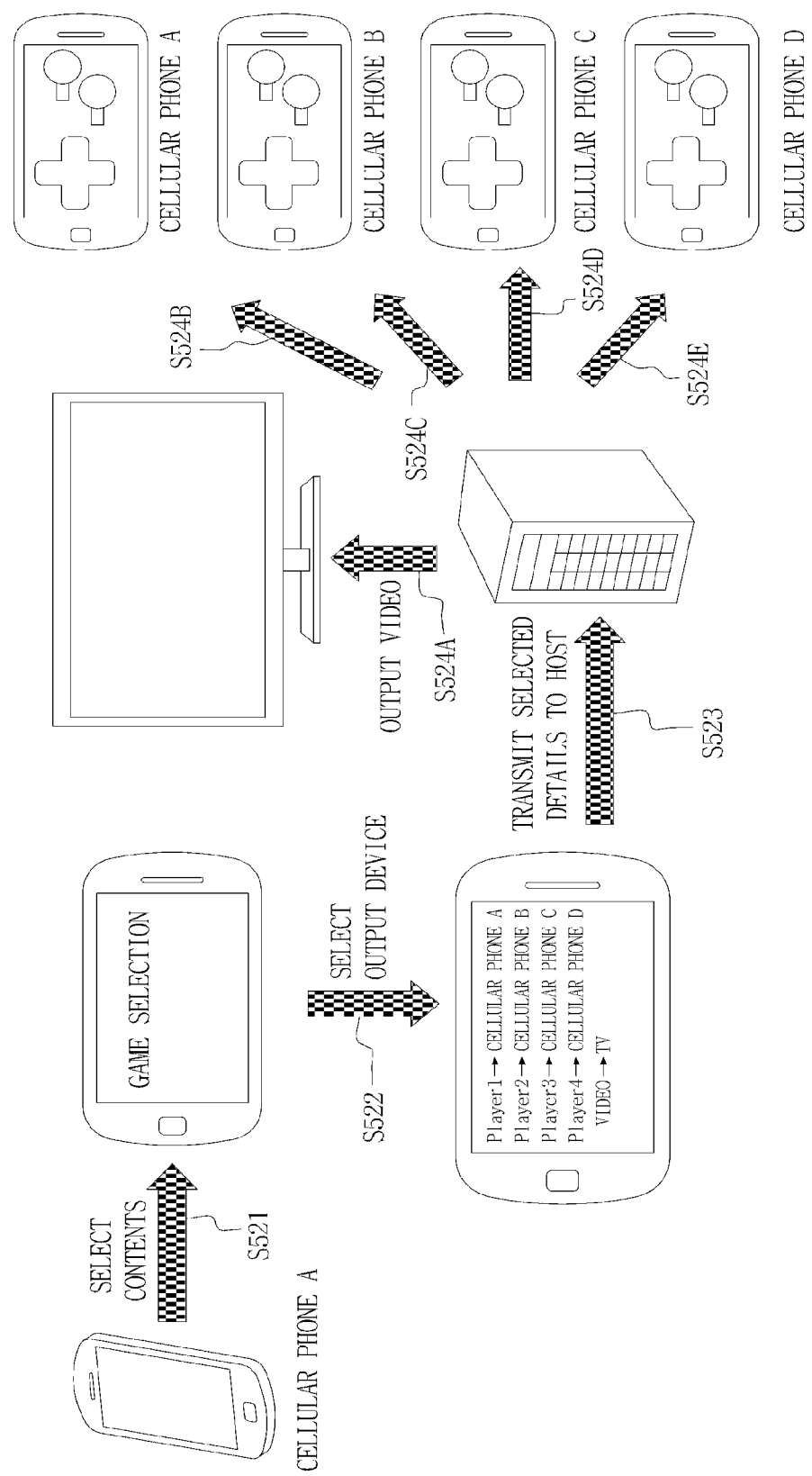
FIG. 5B is an illustration of the process of sharing content using a mobile terminal according to an exemplary embodiment.

FIG. 5B is an illustration of the process of sharing content using a mobile terminal according to an exemplary embodiment.

FIG. 5B is a view illustrating a process of sharing game content using a mobile terminal according to an exemplary embodiment. In order for multiple users A, B, C and D to play the same soccer game, the user A selects a soccer game as arbitrary content, in operation S521, and connects a mobile terminal to a host. The host transmits to the mobile terminal device information, i.e., a device list of devices capable of outputting the selected game content, and the user selects output devices using the device list. In operation S522, the user selects cellular phones A, B, C and D and a TV as the output devices. The user may select cellular phones A, B, C and D as control devices and a TV as a video device. The mobile terminal transmits the selected details to the host in operation S523. The host transmits video information of the game to the TV in operation S524A, and transmits information about a control mode capable of controlling the game to the cellular phones A, B, C and D in operations S524B, S524C, S524D and S524E, respectively.

In an exemplary embodiment, a printer may be controlled using the mobile terminal. While selecting photo content stored in the mobile terminal, a user selects output devices. As output devices, the user selects a TV as a video device, a printer as an output device and a mobile terminal as a control device. Then, while watching photo content on the TV, the user may control arbitrary photos to be printed through the printer using the mobile terminal.

Figure 6:
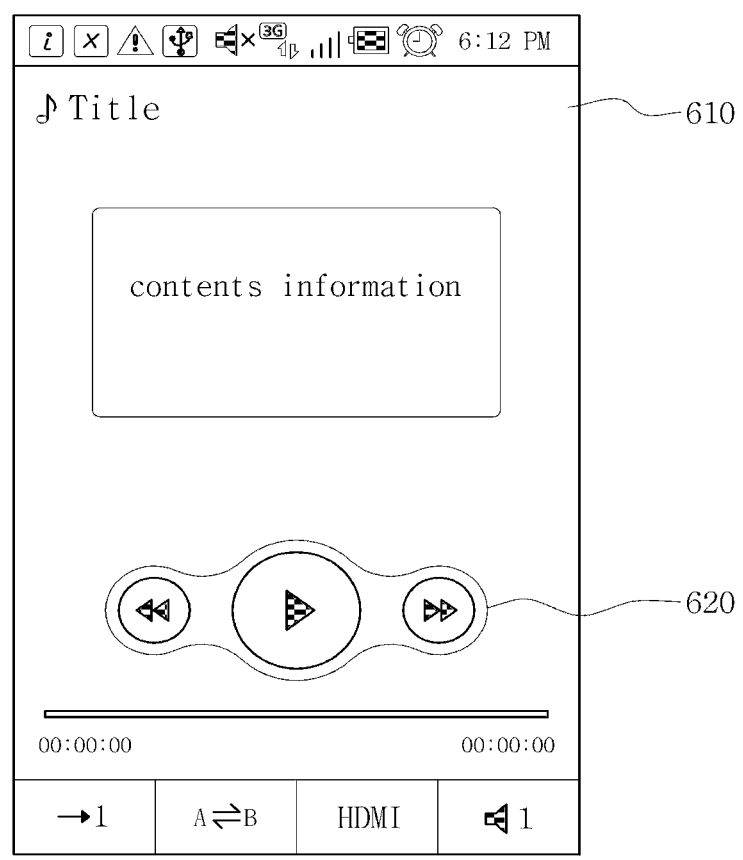
FIG. 6 is an illustration of the control mode of a mobile terminal according to an exemplary embodiment.

FIG. 6 is an illustration of the control mode of a mobile terminal according to an exemplary embodiment.

In FIG. 6, the control mode of a mobile terminal corresponds to a control mode to control the reproduction of audio information, such as music. The control mode may include a background 610 and a control image 620. The background 610 may include a general information display area that displays general information and buttons to control the mobile terminal. In an exemplary embodiment, the background 610 may displays the title and a progress bar of the song being reproduced by the mobile terminal, a content information display area, which displays content information, a volume button, etc. The control image 620 may include multiple buttons, which allow a user to control the reproduction of the content, such as play, fast forward and reverse, etc.

As described above, in a mobile terminal and a control method using the same, the mobile terminal can share content with a device physically separated therefrom, and can perform integrated information management with respect to the separated device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile terminal comprising:
a communication unit to communicate with a host and a device;
a search unit to receive content information and device information from the host;
an input unit to receive a content selection signal and a device selection signal; and
a control unit to transmit to the host a control command to control a selected content corresponding to the content selection signal to be outputted to a selected device corresponding to the device selection signal.

2. The mobile terminal of claim 1, wherein the control unit generates a control command for the selected device based on a control mode and transmits the control command to the selected device or host.

3. The mobile terminal of claim 2, wherein if the control unit does not have a control mode for the selected device, the control unit receives the control mode from the host.

4. The mobile terminal of claim 2, wherein if the control unit does not have a control mode for the selected device, the control unit receives the control mode from the selected device.

5. The mobile terminal of claim 1, wherein the search unit receives device information from the host if a content selection signal is received through the input unit.

6. The mobile terminal of claim 1, further comprising:
a memory unit to store the content information,
wherein if the input unit receives the content selection signal and the device selection signal, the control unit transmits to the host a control command to control a selected content corresponding to the content selection signal.

7. The mobile terminal of claim 6, further comprising a display unit,
wherein if the content selection signal and the device selection signal are received, the control unit displays a control image for controlling the selected device on the display unit and controls the selected device through the control image.

8. The mobile terminal of claim 7, wherein the control unit receives additional information including one or more of information about the content, evaluation details, directions or outlines about the selected content from the host or the selected device.

9. The mobile terminal of claim 8, wherein the control unit displays the additional information.

10. The mobile terminal of claim 1, wherein the control unit further transmits a control command specifying an output method for the selected content to the host.

11. The mobile terminal of claim 1, wherein the control unit transmits a control command for recovering the selected content to the host or the selected device.

12. A control method of a mobile terminal, comprising:
receiving content information and device information from a host;
receiving a content selection signal and a device selection signal;
generating a control command for controlling a content corresponding to the content selection signal; and
transmitting the control command to the host.

13. The method of claim 12, wherein the receiving of the content selection signal comprises:
storing content information; and
receiving a content selection signal.

14. The method of claim 13, further comprising:
controlling a device corresponding to the device selection signal.

15. The method of claim 14, wherein the controlling a device further comprises:
generating a control command for the selected device based on a control mode.

16. The method of claim 15, wherein if the control mode is not available for the selected device, receiving the control mode.

17. The method of claim 14, wherein the controlling the device comprises transmitting to the host or the selected device a control command for controlling the device.

18. The method of claim 12, further comprising:
receiving a device selection signal.

19. The method of claim 12, wherein the controlling of the selected device comprises receiving additional information about the content.

20. A system for sharing content, comprising:
a mobile terminal;
a host; and
a plurality of devices,
wherein the mobile terminal receives content information and device information from the host, selects content from the content information and selects at least one device from the plurality of devices, transmits information containing the selection of the content and the selected device to the host;
wherein the host transmits the content to the selected device, and
wherein the mobile terminal controls the selected device, via the host, based on a control mode.

21. The system of claim 20, wherein if the mobile terminal does not have a control mode to control the device stored therein, the mobile terminal receives the control mode from the host or the selected device.

\* \* \* \* \*